UNITED STATES PATENT OFFICE.

ANDREW P. JACKSON, OF WARSAW, INDIANA, ASSIGNOR TO HIMSELF AND OTIS PRATT, OF SAME PLACE.

IMPROVED ROOFING COMPOSITION.

Specification forming part of Letters Patent No. 69,917, dated October 15, 1867.

*To all whom it may concern:*

Be it known that I, ANDREW P. JACKSON, of Warsaw, in the county of Kosciusko and State of Indiana, have invented a new and Improved Composition for Roofing; and I do hereby declare the following to be a full, clear, and exact description of the same.

The main feature in this invention is the use of a mineral found in great quantities near Dayton, Ohio, in combination with tar, sulphur, plumbago, and litharge, as a roofing material.

Extensive beds of a mineral, called "blue-stone" by the people where it is found, have long been known to exist near the town of Dayton, in the State of Ohio. I have discovered that this mineral, when ground fine and mingled in the proper manner with the substances above specified, is very valuable for making composition roofing.

I use the materials in the following proportions: Ground blue-stone, sixty-five pounds; tar, seven gallons; sulphur, ten pounds; litharge, four pounds; plumbago, six pounds.

To prepare this composition from these materials, I first heat the tar to 225° Fahrenheit; then apply the sulphur or brimstone, which will do as well, which fuses at 220°. When the mass is fused I add the blue-stone, and afterward the plumbago and litharge.

I do not desire to limit myself to the use of the blue-stone, tar, and sulphur, in combination with the plumbago and litharge, for while the addition of the latter materials improves the composition, giving it greater body and firmness, the combination of the blue-stone, sulphur, and tar forms the main feature of my invention. I may, on the other hand, omit either the plumbago or litharge, retaining one and rejecting the other in my composition, although both combined make the better composition.

The composition thus produced is equally as useful for coating the inside of coal-oil barrels, the bottoms of vessels, the outside of piles, or other timber or structures, as for roofing, and I may manufacture and use it for that purpose, as well as for covering and protecting roofs.

Having thus described my invention, what I claim as new, and desire to secure by Letters Patent, is—

The composition above described, when compounded and used substantially as and for the purposes specified.

A. P. JACKSON.

Witnesses:
 EDGAR HAYMOND,
 CHARLES G. MUGG.